United States Patent
Uchiyama et al.

(10) Patent No.: US 8,878,128 B2
(45) Date of Patent: Nov. 4, 2014

(54) MICROCHANNEL PLATE

(71) Applicant: Hamamatsu Photonics K.K., Hamamatsu (JP)

(72) Inventors: Toshiyuki Uchiyama, Hamamatsu (JP); Yusuke Hayase, Hamamatsu (JP); Katsuyuki Ishiguro, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 13/894,868

(22) Filed: May 15, 2013

(65) Prior Publication Data

US 2013/0313422 A1 Nov. 28, 2013

Related U.S. Application Data

(60) Provisional application No. 61/648,752, filed on May 18, 2012.

(51) Int. Cl.
*H01J 43/04* (2006.01)
*H01J 43/24* (2006.01)

(52) U.S. Cl.
CPC ............... *H01J 43/246* (2013.01); *H01J 43/04* (2013.01)
USPC . 250/288; 250/281; 250/336.1; 313/103 CM; 313/105 CM

(58) Field of Classification Search
USPC ................ 250/281, 288, 336.1; 313/103 CM, 313/105 CM
See application file for complete search history.

(56) References Cited

U.S. PATENT DOCUMENTS

| 3,979,621 | A | | 9/1976 | Yates |
| 3,979,637 | A | | 9/1976 | Siegmund |
| 4,629,486 | A | | 12/1986 | Uchiyama et al. |
| 4,737,013 | A | * | 4/1988 | Wilcox .......................... 385/120 |
| 5,034,354 | A | | 7/1991 | Fine |
| 5,493,169 | A | * | 2/1996 | Pierle et al. ............. 313/103 CM |
| 7,990,032 | B2 | * | 8/2011 | Downing et al. ......... 313/103 R |
| 2004/0005433 | A1 | | 1/2004 | Iguchi et al. |
| 2010/0044577 | A1 | * | 2/2010 | Sullivan et al. .......... 250/390.01 |

FOREIGN PATENT DOCUMENTS

| GB | 2120232 A | 11/1983 |
| JP | 57-25934 B2 | 6/1982 |
| JP | 58-208151 A | 12/1983 |
| JP | 63-128544 A | 6/1988 |
| JP | 2-10645 A | 1/1990 |
| JP | 2001351509 A | 12/2001 |
| JP | 2002512737 A | 4/2002 |
| JP | 2011129362 A | 6/2011 |
| WO | WO-2006/030820 A1 | 3/2006 |
| WO | WO-2006/123447 A1 | 11/2006 |
| WO | WO-2009108636 A1 | 9/2009 |

* cited by examiner

*Primary Examiner* — Phillip A Johnston
*Assistant Examiner* — Hsien Tsai
(74) *Attorney, Agent, or Firm* — Drinker Biddle & Reath LLP

(57) ABSTRACT

The present invention relates to a low-resistance MCP with an expanded dynamic range and excellent environment resistance, in comparison with the conventional technology. The MCP has a double structure composed of hollow first cladding glasses whose inner wall surfaces function as channel walls, and a second cladding glass having an acid resistance lower than that of the first cladding glasses.

19 Claims, 13 Drawing Sheets

MICROCHANNEL PLATE

BACKGROUND OF THE INVENTION

1. Field of the Invention

The present invention relates to a microchannel plate (which will be referred to hereinafter as MCP) used in an image intensifier, an ion detector, and inspection equipment including the ion detector, e.g., such as a mass spectrometer, a photoelectron spectrometer, an electron microscope, or a photomultiplier tube.

2. Related Background Art

A microchannel plate (MCP) has a plate-like structural body (main body) and is known as an electron multiplier in which a plurality of channels are regularly arranged. FIG. 1A is a partly broken drawing showing a structure of a typical MCP (single cladding structure) and FIG. 1B is a drawing for explaining an example of use of the MCP.

More specifically, the conventional MCP 6 is a thin disk-shaped structural body (main body) containing lead glass as a major component, in which a large number of small-diameter holes 62 penetrating in the thickness direction are arranged except for an annular periphery 61 and in which electrodes 63 are formed on both sides of the structural body by evaporation. The electrodes 63 are not formed so as to cover the entire surface of MCP 6 but formed so as to expose the periphery 61 of MCP 6 in a region of 0.5 mm to 1.0 mm from the outer edge.

In the MCP 6, as shown in FIG. 1B, the input-side electrode 4 (electrode 63) and output-side electrode 7 (electrode 63) are arranged on the front side and on the back side, respectively, and a predetermined voltage is applied between them by a power supply 15, whereby, when an inner wall (channel wall) defining a hole 62 is bombarded by a charged particle 16 such as an electron or an ion incident into the hole 62, the inner wall emits secondary electrons. This process results in multiplying the incident electron or the like. An aspect ratio of channel (=L/D) is given by the length L of the hole 62 serving as a channel, and the diameter D (channel diameter) of the hole 62.

Particularly, in recent years, there are increasing needs for expansion of the dynamic range of the MCP having the above-described structure, with expansion of application fields thereof.

SUMMARY OF THE INVENTION

The Inventors conducted detailed research on the conventional microchannel plate (MCP) and found the problem as discussed below.

Specifically, it is conceivable to reduce the resistance of MCP, in order to meet the needs for expansion of the dynamic range as described above.

However, the MCP is an electron multiplier comprised of lead glass and has electric conduction based on hopping conduction as semiconductors do. Therefore, the MCP has a negative temperature characteristic of electric resistance and it is known that the MCP itself generates heat with flow of current to reduce the electric resistance. This phenomenon conspicuously appears, particularly, in the case of the low-resistance MCP. There are also possibilities that a thermal runaway occurs eventually to raise the temperature of the MCP itself to a melting temperature of the glass (sag temperature: deformation point), or that the heat generation causes a large amount of gas to be evolved from the interior of the glass in an intermediate stage, so as to result in discharging.

In order to improve the temperature characteristic of electric resistance of MCP as described above, it is conceivably effective to increase a content of lead in the glass being the major constituent material of the MCP. However, the increase of the lead content in the glass leads to significant degradation of acid resistance of the MCP. Since channels (a plurality of holes provided in the glass structural body) are formed by etching in a manufacturing step of the MCP, the degradation of acid resistance will make it difficult to manufacture the MCP itself and result in failure in stable MCP production. In addition, the completed MCP will absorb water in air because of lead (oxidation thereof), depending on environments. In this case, the MCP is subject to volume expansion to cause a warp and/or flexure and is likely to end up with cracking.

Since the conventional MCP is the structural body comprised of lead glass, as described above, the lead glass is exposed to air during transportation and during storage. The MCP with the dynamic range characteristic improved by the increase of the lead content had the problem that it was inferior in acid resistance and strength and easy to suffer degradation of environment resistance, e.g., characteristic degradation or shape change due to humidity.

The present invention has been accomplished in order to solve the problem as described above and it is an object of the present invention to provide an MCP with excellent environment resistance (including weather resistance) achieving a wider dynamic range than in the conventional technology, and application apparatus thereof.

A microchannel plate (MCP) according to the present invention is a sensing device comprised of lead glass which exhibits electric insulation before a reduction treatment and exhibits electric conduction after the reduction treatment. In order to achieve the above object, a typical MCP employs a double cladding structure composed of two types of cladding glasses having different chemical properties.

As a first aspect of the present invention, the MCP comprises a plurality of first cladding glasses, and a second cladding glass integrally surrounding each of the first cladding glasses. In comparison before the reduction treatment, each of the first cladding glasses has an acid resistance higher than an acid resistance of the second cladding glass. Each of the first cladding glasses has a hollow structure extending along a predetermined direction and an inner wall surface thereof functions as a channel wall (secondary electron emitting layer). The second cladding glass is a member that fills gaps among the first cladding glasses arranged as separated by a predetermined distance from each other. Therefore, the second cladding glass is located at least in part in spaces among outer peripheral surfaces of the first cladding glasses in a state in which the second cladding glass is in contact with the outer peripheral surfaces of the respective first cladding glasses.

In the double cladding type MCP, as described above, the acid resistance of the first cladding glasses is set higher than that of the second cladding glass, which effectively suppresses the breakage of the MCP itself due to the degradation of environment resistance.

In a second aspect applicable to the above-described first aspect, as a resistance to any one of hydrochloric acid, nitric acid, sulfuric acid, phosphoric acid, and mixture solutions of these acids, the acid resistance before the reduction treatment of the first cladding glasses is set higher than the acid resistance before the reduction treatment of the second cladding glass.

As a third aspect applicable to at least either of the above first and second aspects, a lead content of the second cladding glass is larger than a lead content of the first cladding glasses.

A more specific glass composition is preferably a fourth aspect applicable to at least any one of the above first to third aspects, wherein the first cladding glasses before the reduction treatment contain lead oxide at a weight percentage of not less than 20.0% and less than 48.0% and wherein the second cladding glass before the reduction treatment contains lead oxide at a weight percentage of not less than 48.0% and less than 65.0%. Furthermore, as a fifth aspect applicable to at least any one of the above first to fourth aspects, preferably, the first cladding glasses before the reduction treatment contain silicon dioxide at a weight percentage of not less than 40.0% and less than 65.0% and the second cladding glass before the reduction treatment contains silicon dioxide at a weight percentage of not less than 20.0% and less than 40.0%.

As a sixth aspect applicable to at least any one of the above first to fifth aspects, the first cladding glasses may contain zirconium oxide before the reduction treatment, in order to improve the acid resistance.

In the MCP according to the present invention, the second cladding glass functions as a main electroconductive part. Therefore, the second cladding glass preferably has a constant width, for achieving uniformity of electric conduction. Then, as a seventh aspect applicable to at least any one of the above first to sixth aspects, outer peripheries of the first cladding glasses are preferably deformed in a hexagonal shape in a cross section of the MCP perpendicular to the predetermined direction whereby the second cladding glass constitutes a honeycomb structure. In this case, the second cladding glass between the first cladding glasses has a uniform width (the second cladding glass between the first cladding glasses partly has a strip shape with the uniform width), which can effectively suppress unevenness of supply of charge supplied to each first cladding glass.

As an eighth aspect applicable to at least any one of the above first to seventh aspects, in the cross section of the main body perpendicular to the predetermined direction, an area ratio of the first cladding glasses in the cross section is smaller than an area ratio of the second cladding glass in the cross section. More specifically, as a ninth aspect applicable to at least any one of the above first to eighth aspects, in the cross section of the main body perpendicular to the predetermined direction, the area ratio of the second cladding glass in the cross section is preferably not less than 25%. It is noted that the cross section of the main body is defined by only a glass region excluding regions corresponding to spaces defined by inner walls of the first cladding glasses.

As a tenth aspect, an MCP according to the present invention may comprise a coating material having an acid resistance higher than the acid resistance of the second cladding glass, instead of the aforementioned first cladding glasses. Namely, the MCP according to the tenth aspect comprises a main body comprising: a cladding glass which has through holes each extending along a predetermined direction and which contains lead oxide at a weight percentage of not less than 48.0% and less than 65% before a reduction treatment; and a coating material with a higher acid resistance provided on inner walls of the through holes in the cladding glass. Surfaces of this coating material function as channel walls.

As an eleventh aspect applicable to the tenth aspect, the cladding glass before the reduction treatment preferably contains silicon dioxide at a weight percentage of not less than 20.0% and less than 40.0%.

The MCP constructed according to at least any one of the first to eleventh aspects as described above, or according to a combination of these aspects (i.e., the MCP according to the present invention) is applicable to a variety of sensing devices.

For example, as a twelfth aspect, the MCP constructed according to at least any one of the above first to eleventh aspects, or according to a combination of these aspects is applicable to an image intensifier. As a thirteenth aspect, the MCP constructed according to at least any one of the above first to eleventh aspects, or according to a combination of these aspects is applicable to an ion detector. Furthermore, as a fourteenth aspect, the ion detector according to the thirteenth aspect is applicable to a variety of inspection equipment. As a fifteenth aspect applicable to any one of the thirteenth and fourteenth aspects, the inspection equipment to which the ion detector of the thirteenth aspect is applied includes, for example, a mass spectrometer, a photoelectron spectrometer, an electron microscope, or a photomultiplier tube.

As an example, the mass spectrometer comprises an ionization unit to ionize a specimen, an analysis unit to separate the specimen ionized by the ionization unit, into ions according to a mass charge ratio, and an ion detection unit to detect the ions having passed the analysis unit. This ion detection unit includes the MCP constructed according to at least any one of the above first to eleventh aspects, or according to a combination of these aspects, as the ion detector according to the thirteenth aspect.

Each of embodiments according to the present invention will become more fully understood from the detailed description given hereinbelow and the accompanying drawings. These examples are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, and that various modifications and improvements within the spirit and scope of the invention will become apparent to those skilled in the art from this detailed description.

DETAILED DESCRIPTION OF THE EMBODIMENTS

Each of embodiments of the microchannel plate (MCP) according to the present invention will be described below in detail with reference to the accompanying drawings. In the description of the drawings, the same portions or the same elements will be denoted by the same reference signs, without redundant description.

Figure 1A:
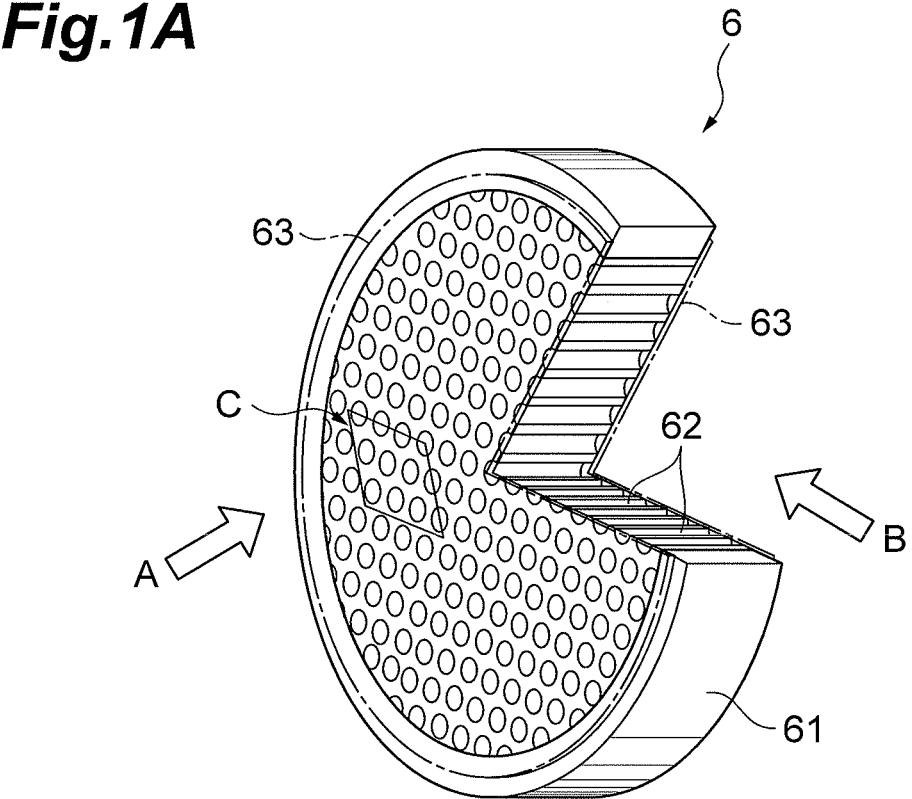
FIG. 1A is a partly broken view showing a structure of a typical MCP (single cladding structure)
Figure 2A:
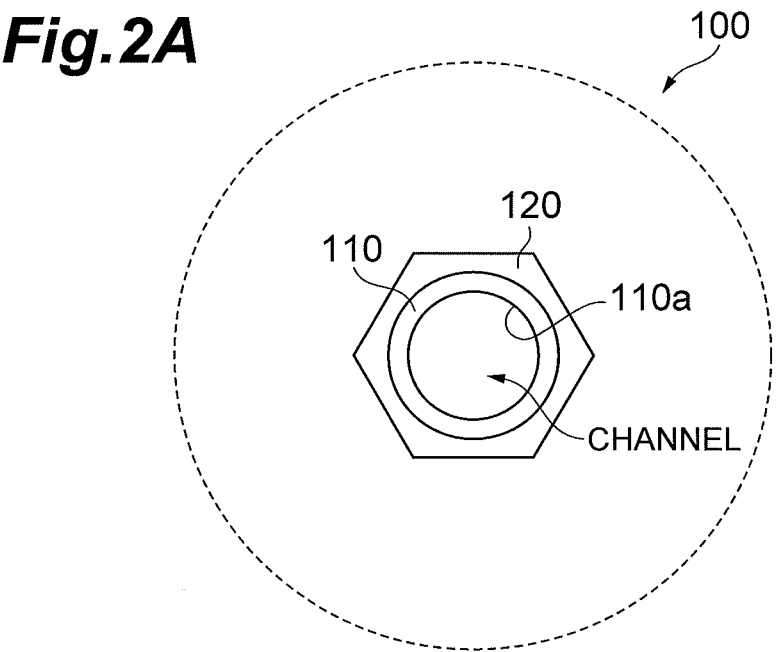
FIGS. 2A and 2B are drawings for explaining structures near a channel in MCPs according to the present embodiment.
Figure 2B:
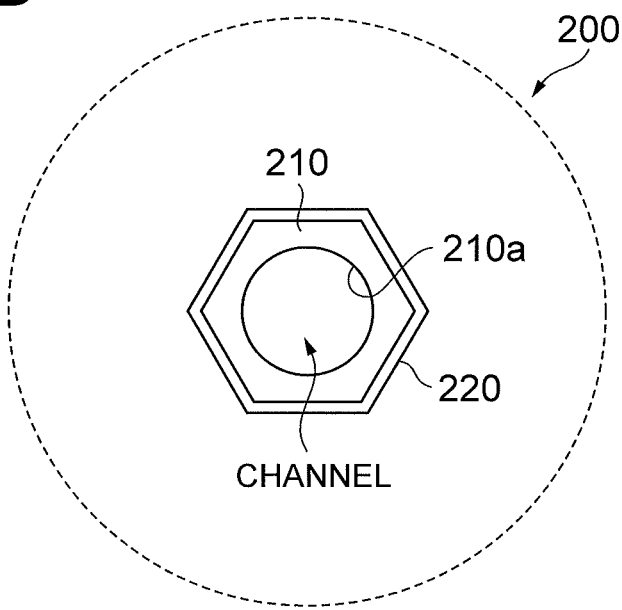
Figure 3A:
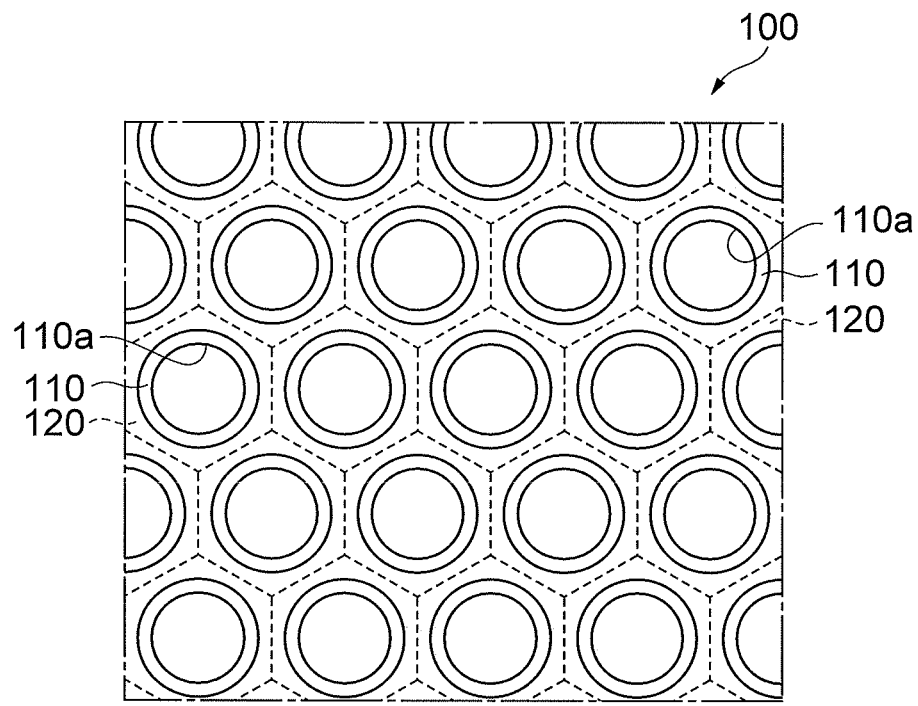
FIGS. 3A and 3B are drawings showing planar structures of the MCPs according to the present embodiment, corresponding to a part of the MCP (region indicated by arrow C) as viewed from a direction indicated by arrow A in FIG. 1A.
Figure 3B:
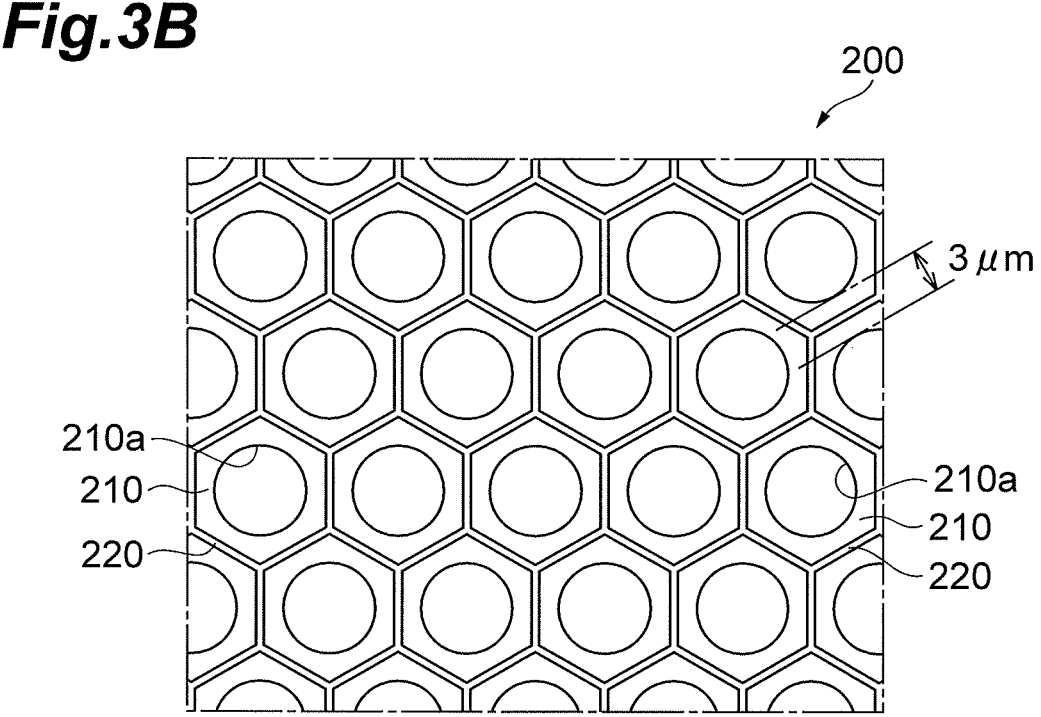

FIGS. 2A and 2B are drawings for explaining structures near a channel in MCPs according to the present embodiment. FIGS. 3A and 3B are drawings showing planar structures of the MCPs according to the present embodiment, which correspond to the part of the MCP (region indicated by arrow C) as viewed from the direction indicated by arrow A in FIG. 1A.

Figure 1B:
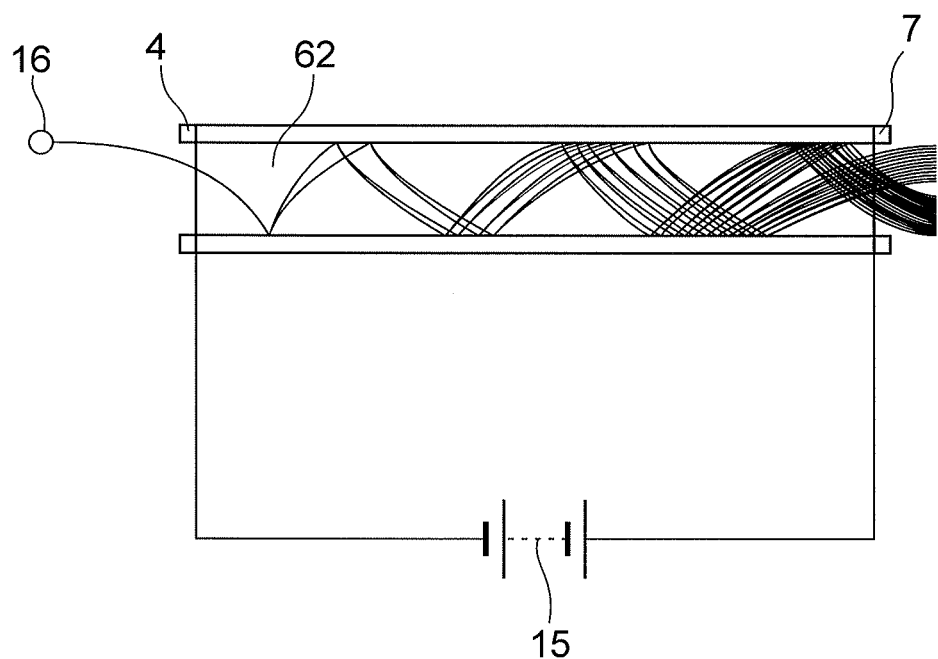
FIG. 1B is a drawing for explaining an example of use of the MCP.

The MCPs according to the present embodiment are electron multipliers having the main body comprised of lead glass which exhibits electric insulation before a reduction treatment and exhibits electric conduction after the reduction treatment, and their basic structure resembles the structure of the MCP 6 shown in FIGS. 1A and 1B. However, the MCPs of the embodiments are different in the structure of the main body (structural body) in which a plurality of holes defining respective channels are formed, from the MCP 6 shown in FIGS. 1A and 1B. Namely, the structural body of the MCP 6 has the single cladding structure, whereas the main body of the MCPs of the embodiments has the double cladding structure.

The MCP 100 of the embodiment shown in FIG. 2A is provided with first claddings 110 (first cladding glasses) an inner wall 110a of each of which functions as a channel wall, and a second cladding 120 (second cladding glass) which is directly provided on outer peripheries of the first claddings 110. In the MCP 100, as shown in FIG. 3A, the double cladding structure shown in FIG. 2A is arranged in a two-dimensional array. On the other hand, the MCP 200 of the embodiment shown in FIG. 2B is provided with first claddings 210 (first cladding glasses) an inner wall 210a of each of which functions as a channel wall, and a second cladding 220 (second cladding glass) which is directly provided on outer peripheries of the first claddings 210. In the MCP 200, as shown in FIG. 3B, the double cladding structure shown in FIG. 2B is arranged in a two-dimensional array. In this MCP 200, outer peripheries of the first claddings 210 are deformed in a hexagonal shape whereby the second cladding 220 constitutes a honeycomb structure.

Specifically, in the double cladding structures shown in FIGS. 2A and 2B, a lead content of the second cladding 120, 220 is set larger than that of the first claddings 110, 210. By adjusting these lead contents, the electric resistivity of the second cladding 120, 220 is set lower than that of the first claddings 110, 210. In comparison before a reduction treatment, the acid resistance of the first claddings 110, 210 is higher than that of the second cladding 110, 220. The acid resistance of each of the first claddings 110, 210 and the second cladding 120, 220 shall refer to resistance to any one of hydrochloric acid, nitric acid, sulfuric acid, phosphoric acid, and mixture solutions of these acids.

It is found by below-described experiments that a preferred composition for the first claddings 110, 210 is such that a weight percentage of silicon dioxide ($SiO_2$) is not less than 40.0% and less than 65.0% and a weight percentage of lead oxide (PbO) before the reduction treatment is not less than 20.0% and less than 48.0%. In the present embodiments, the first claddings 110, 210 contain zirconium oxide before the reduction treatment, for improvement in acid resistance of the first claddings 110, 210. On the other hand, a preferred composition for the second cladding 120, 220 is such that a weight percentage of silicon dioxide ($SiO_2$) is not less than 20.0% and less than 40.0% and a weight percentage of lead oxide (PbO) before the reduction treatment is not less than 48.0% and less than 65.0%.

An area ratio of the first claddings 110, 210 and the second cladding 120, 220 can be optionally selected and the area ratio is first claddings:second cladding=6:4 (the content of the second cladding glass is 40%) in experimental samples of MCPs made by the Inventors. Ideally, the area ratio of the first claddings 110, 210 to an effective surface of the MCP (which is a cladding part or a cross section thereof where the channels are formed) is preferably smaller than the area ratio of the second cladding 120, 220 to the effective surface of the MCP. Specifically, the area ratio of the second cladding 120, 220 is preferably not less than 25%.

The specifications of the experimental samples of MCPs are as described below. Namely, the outside diameter of MCP is 25 mm and the outside diameter of the effective surface of MCP is 20 mm. The channel diameter D is 12 μm and the channel length L 0.48 mm; therefore, the aspect ratio (=L/D) of channels is 40. The bias angle is 8°. The electric properties of the MCP samples were the total MCP resistance of 2.2 MΩ and the gain of 16000 per kV. MCP samples including only the first claddings 110, 210 had the resistance of 54.0 MΩ and the gain of 17000 per kV. MCP samples including only the second cladding 120, 220 had the resistance of 1.0 MΩ and the gain of 21000 per kV.

It is seen from the above result that the MCPs of the double cladding structure are significantly affected not only by the electric characteristics of the cladding portions (first claddings 110, 210) having the inner walls functioning as channel walls, but also by the electric characteristics of the cladding portion (second cladding 120, 220) located outside them. Therefore, the resistance of the entire MCP is an intermediate value between those of the respective cladding portions and reduction of resistance is dominated by the second cladding 120, 220 located outside. Accordingly, the designed resistance of the entire MCP can also be varied by changing the area percentages (alternatively, volume percentages) of the respective claddings. The resistance of the entire MCP can be reduced by increasing the lead content of the second cladding 120, 220.

Figure 4:
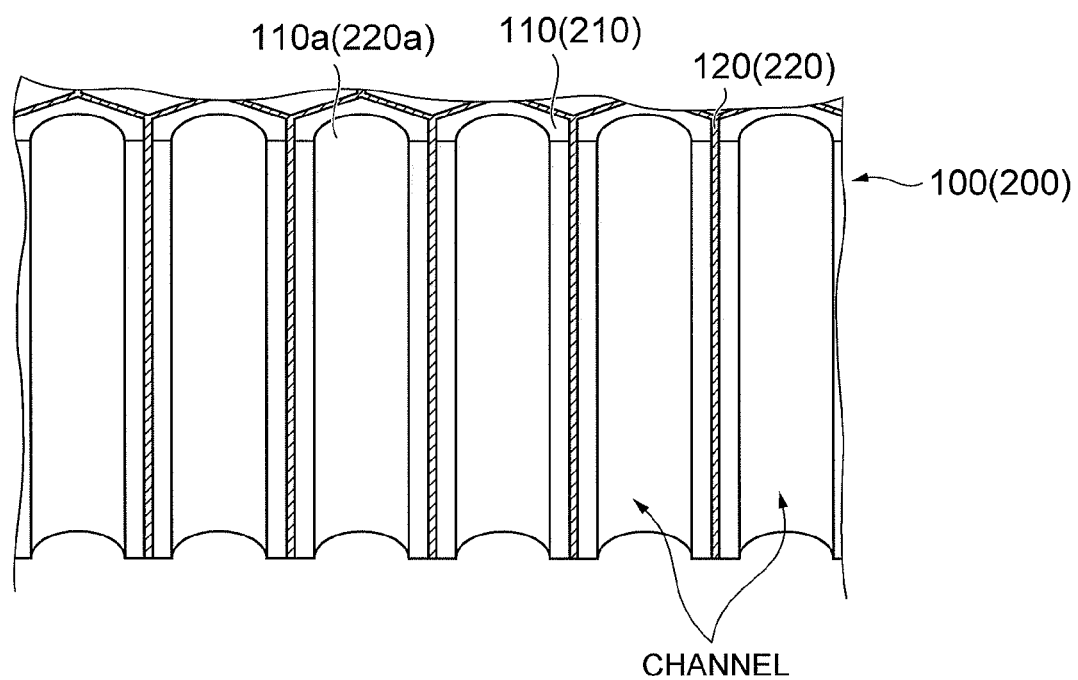
FIG. 4 is a plan view showing an example of a sectional structure of the MCPs according to the present embodiment, corresponding to a cross section of the MCP as viewed from a direction indicated by arrow B in FIG. 1A.
Figure 5:
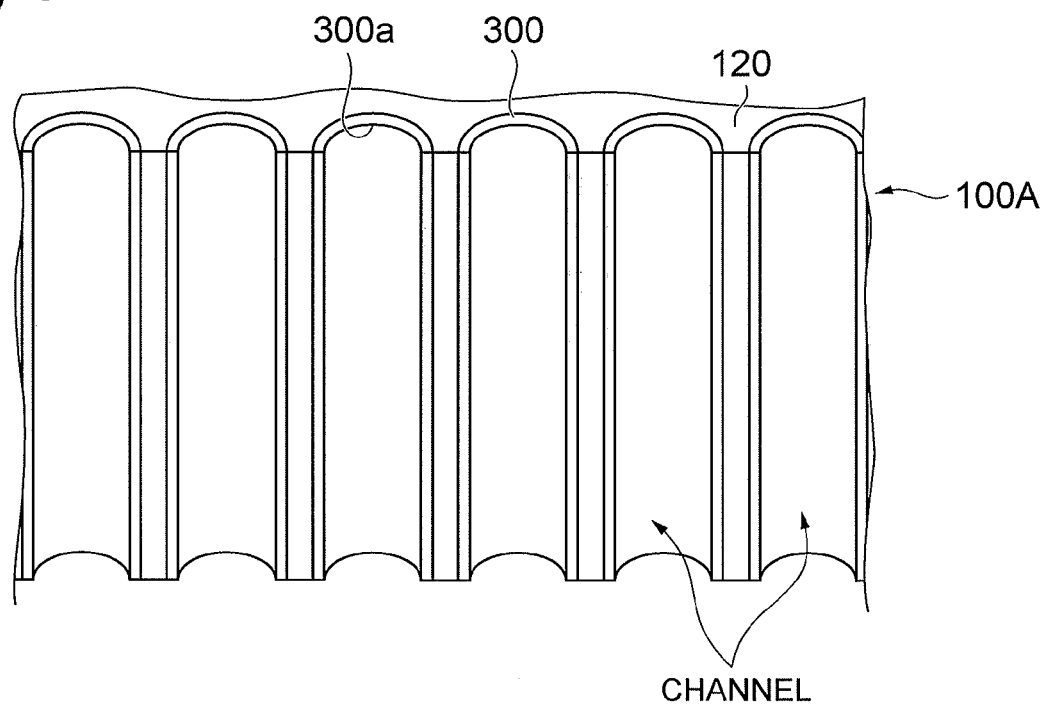
FIG. 5 is a plan view showing another example of a sectional structure of an MCP according to the present embodiment, corresponding to the cross section of the MCP as viewed from the direction indicated by arrow B in FIG. 1A.

It is noted, however, that the above embodiments described the structures of MCPs 100, 200 employing the double cladding structure, as shown in FIG. 4, and that the present embodiment may adopt the structure as shown in FIG. 5. Namely, in the MCP 100A in FIG. 5, a coating material 300 with high acid resistance is provided on inner walls of holes to define channels in the second cladding 120, instead of the first claddings 110 in the MCP 100 shown in FIG. 2A. Therefore, inner walls 300a of the coating material 300 with high acid resistance function as channel walls in the MCP 100A. An example of the coating material 300 is an $Al_2O_3$ film formed in a desired thickness by atomic layer deposition (ALD). FIG. 4 is a plan view showing an example of the sectional structure of the MCP according to the present embodiment, which corresponds to the cross section of the MCP as viewed from the direction indicated by arrow B in FIG. 1A. FIG. 5 is a plan view showing another example of the sectional structure of the MCP according to the present embodiment, which corresponds to the cross section of the MCP as viewed from the direction indicated by arrow B in FIG. 1A.

Figure 6:
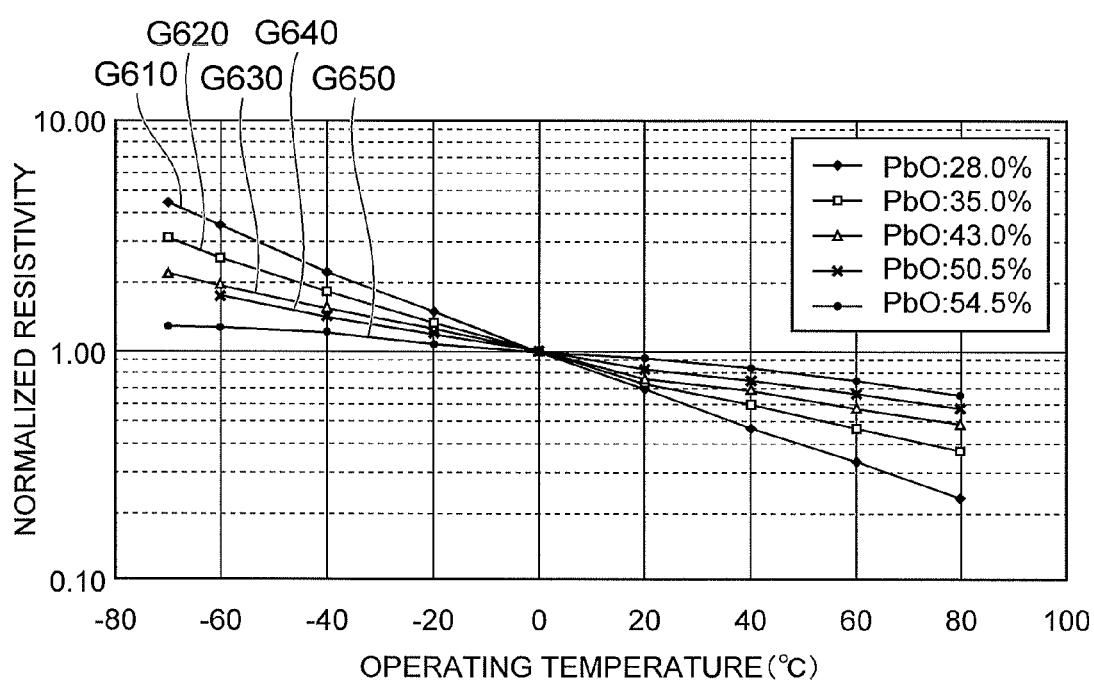
FIG. 6 is graphs showing relations between operation temperature and normalized resistivity for various samples of single-cladding MCPs.

Next, we will examine the environment resistance of MCPs of the double cladding structure employed in the embodiments. FIG. 6 is graphs showing relations (change rate of resistivity) between operation temperature (° C.) and normalized resistivity ($\Omega \cdot m$) with reference to a resistivity at an operation temperature of 0° C., for various samples 1-5 of single-cladding MCPs. Here, the following table 1 represents each resistivity of the samples 1-5 at each of a plurality of temperature environments, and the table 2 is a table corresponding to FIG. 6 and represents the normalized resistivity of each of the samples 1-5 with reference to a resistivity at 0° C. of FIG. 7 is graphs showing relations between the number of days and relative change of flatness about the environment resistance for samples with different lead oxide contents of single-cladding MCPs.

ity-temperature characteristic shown in the table 2) of the single-cladding MCP (sample 1) wherein the PbO content before the reduction treatment is 28.0%; graph G620 the environment resistance of the single-cladding MCP (sample 2) wherein the PbO content before the reduction treatment is 35.0%; graph G630 the environment resistance of the single-cladding MCP (sample 3) wherein the PbO content before the reduction treatment is 43.0%; graph G640 the environment resistance of the single-cladding MCP (sample 4) wherein the PbO content before the reduction treatment is 50.5%; graph G650 the environment resistance of the single-cladding MCP (sample 5) wherein the PbO content before the reduction treatment is 54.5%.

As seen from FIG. 6, it is found that the temperature change of resistivity becomes smaller as the PbO content increases and that it is preferable to increase the content of lead oxide (before the reduction treatment), for reduction of resistance.

Figure 7:
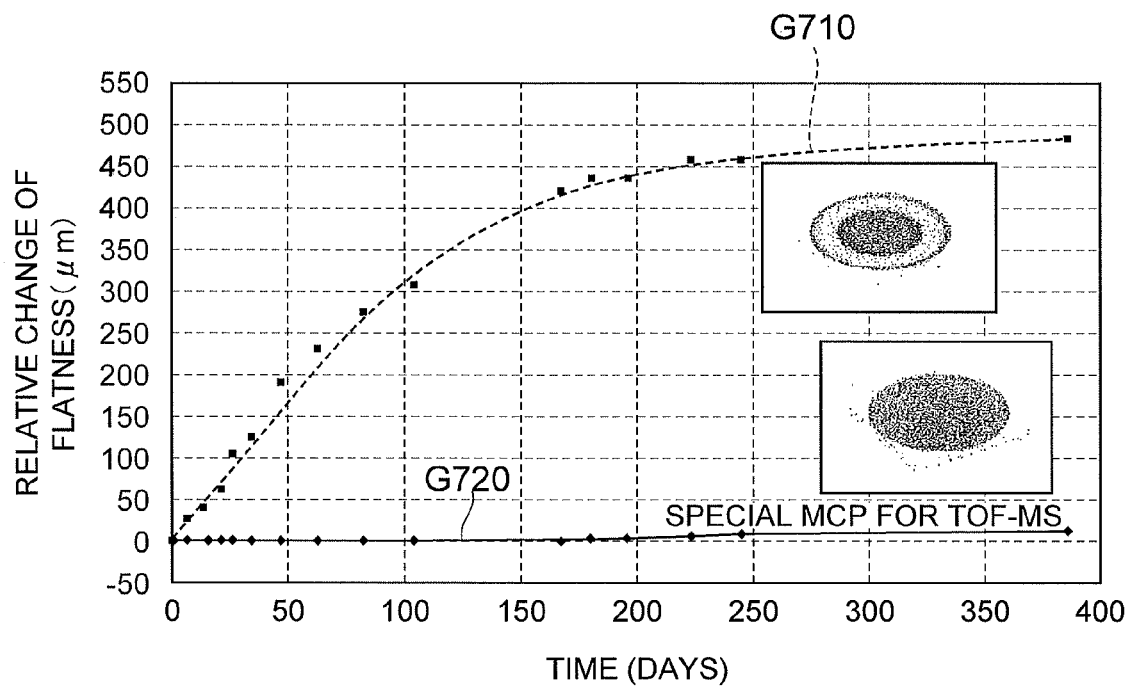
FIG. 7 is graphs showing relations between the number of days and relative change of flatness about environment resistance for samples of single-cladding MCPs having different contents of lead oxide.

On the other hand, in FIG. 7, graph G710 shows the environment resistance (flatness change) of the single-cladding MCP wherein the PbO content before the reduction treatment is 51.0%, and graph G720 the environment resistance of the single-cladding MCP wherein the PbO content is 43%, as a comparative example. As shown in this FIG. 7, the environment resistance is heavily deteriorated with the larger amount of lead oxide. When the MCP is placed in air, the MCP itself comes to have flexure and suffer structural degradation such as cracking eventually.

Figure 8:
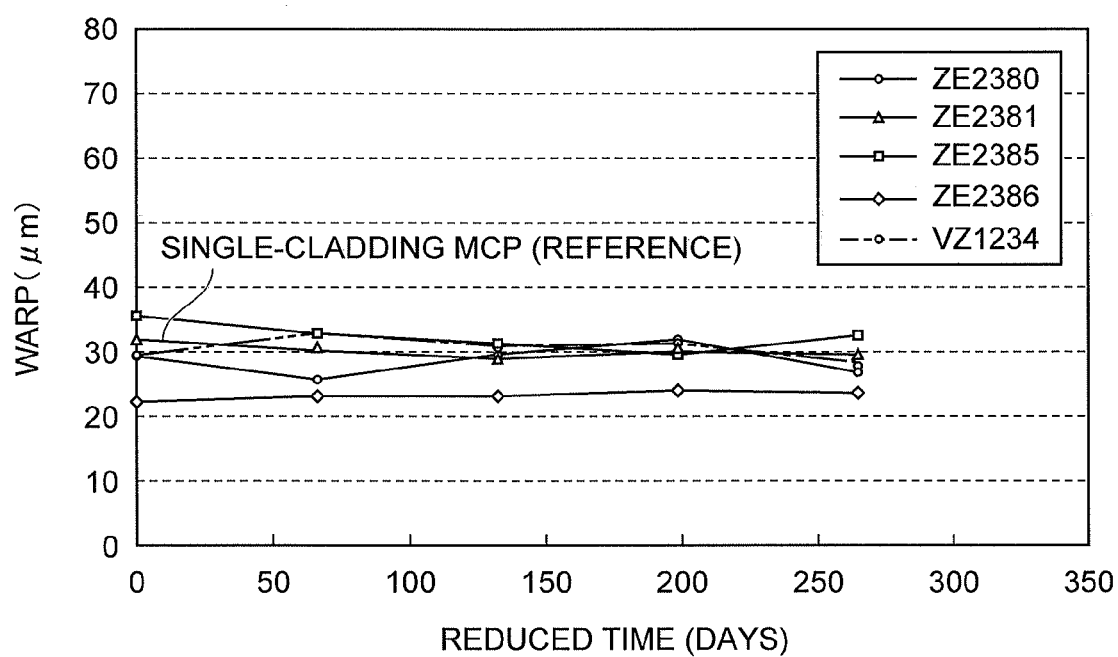
FIG. 8 is graphs showing relations between the number of days and warp about environment resistance for various samples of double-cladding MCPs, with respect to a typical single-cladding MCP.

Furthermore, FIG. 8 is graphs showing relations between the number of days and warp about the environment resistance for various samples of double-cladding MCPs, with respect to a typical single-cladding MCP. We prepared four types of samples. In each of the samples, the first claddings 110, 210 contain lead oxide at the weight percentage of not less than 20.0% and less than 48.0% before the reduction treatment and silicon dioxide at the weight percentage of not less than 40.0% and less than 65.0% before the reduction treatment, and the second cladding 120, 220 contains lead oxide at the weight percentage of not less than 48.0 and less

TABLE 1

| SAMPLE No. | PbO (wt %) | OPERATION TEMPERATURE (° C.) | | | | | | | | | |
|---|---|---|---|---|---|---|---|---|---|---|---|
| | | −70 | −60 | −40 | −20 | 0 | 20 | 40 | 60 | 80 | 100 |
| 1 | 28.0 | 1724 | 1370 | 862 | 568 | 388 | 265 | 179 | 127 | 91 | — |
| 2 | 35.0 | 389 | 327 | 235 | 169 | 130 | 96 | 76 | 61 | 50 | — |
| 3 | 43.0 | 192 | 170 | 132 | 106 | 88 | 73 | 61 | 51 | 44 | — |
| 4 | 50.5 | — | 493 | 403 | 337 | 284 | 238 | 212 | 187 | 164 | — |
| 5 | 54.5 | 3.43 | 3.36 | 3.16 | 2.87 | 2.66 | 2.51 | 2.25 | 1.96 | 1.73 | 1.56 |

TABLE 2

| SAMPLE No. | PbO (wt %) | OPERATION TEMPERATURE (° C.) | | | | | | | | |
|---|---|---|---|---|---|---|---|---|---|---|
| | | −70 | −60 | −40 | −20 | 0 | 20 | 40 | 60 | 80 |
| 1 | 28.0 | 4.44 | 3.53 | 2.22 | 1.46 | 1.00 | 0.68 | 0.46 | 0.33 | 0.23 |
| 2 | 35.0 | 2.99 | 2.52 | 1.81 | 1.30 | 1.00 | 0.74 | 0.58 | 0.47 | 0.38 |
| 3 | 43.0 | 2.18 | 1.93 | 1.50 | 1.20 | 1.00 | 0.83 | 0.69 | 0.58 | 0.50 |
| 4 | 50.5 | — | 1.74 | 1.42 | 1.19 | 1.00 | 0.84 | 0.75 | 0.66 | 0.58 |
| 5 | 54.5 | 1.29 | 1.26 | 1.19 | 1.08 | 1.00 | 0.94 | 0.85 | 0.74 | 0.65 |

As can be seen from the table 1, in a temperature range of from −70° C. to +80° C., the resistivity of each of the samples 1-5 has a tendency to decrease as the temperature is raised. Furthermore, in FIG. 6 that corresponds to the table 2, graph G610 shows the environment resistance (normalized resistivthan 65.0% before the reduction treatment and silicon dioxide at the weight percentage of not less than 20.0% and less than 40.0% before the reduction treatment.

It is seen from the result shown in this FIG. 8 that every sample of double-cladding MCP has the environment resistance substantially equivalent to that of the single-cladding MCP as a reference (or is improved in the environment resistance).

Figure 9:
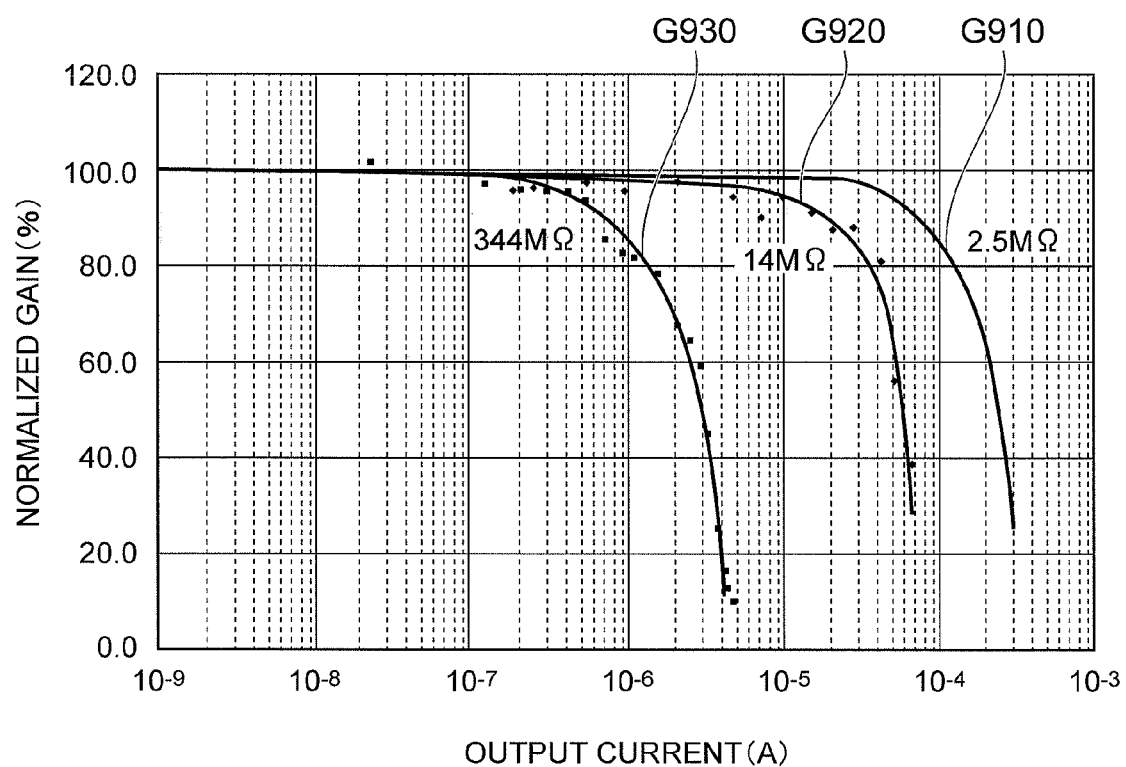
FIG. 9 is graphs showing saturation characteristics of samples having different MCP structures.

Furthermore, FIG. 9 is graphs showing saturation characteristics of samples with different structures of MCPs. In this FIG. 9, graph G910 shows the linearity of the double-cladding MCP wherein the MCP resistance is 2.5 MΩ, graph G920 the linearity of the single-cladding MCP wherein the MCP resistance is 14.0 MΩ, and graph G930 the linearity of the single-cladding MCP wherein the MCP resistance is 344.0 MΩ. It is also seen from this result that the linearity is also extended by reduction of resistance in the case of the MCP having the double cladding structure (or the dynamic range is expanded).

As described above, it became feasible to readily manufacture the low-resistance MCP with satisfactory environment resistance, by applying the glass material with excellent acid resistance to the first claddings 110, 210 (the inner walls of which function as channel walls). It is noted herein that the width of the second cladding 220 as a main electroconductive part becomes constant when the shape of the boundary between the first cladding 210 and the second cladding 220 is hexagonal, as shown in FIG. 2B. In this case, the current density becomes uniform in the electroconductive part and thus charge can be supplied in just proportion everywhere in the MCP. For the second cladding 120, 220 to constitute the honeycomb structure as shown in FIG. 3B, the viscosities defined at the respective sag temperatures (deformation points) of the first claddings 110, 210 and the second cladding 120, 220 are preferably equal or close to each other.

A manufacturing method of the MCP 200 according to the present embodiment will be described below based on FIGS. 10A to 10I. The method described hereinafter is an example of the MCP 200 of a circular cross section, MFs 10 having a regular hexagonal cross section, and use of an acid solution (e.g., HNO₃ or HCl).

Figure 10C:
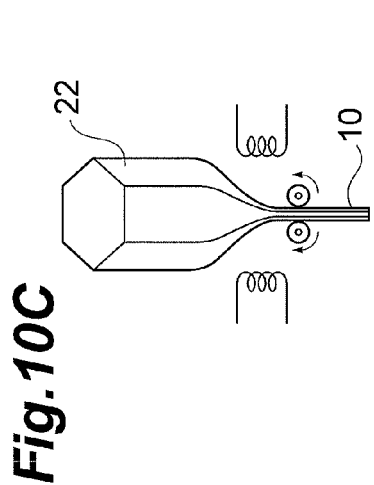
FIGS. 10A to 10I are drawings for explaining a manufacturing method of a double-cladding MCP according to the present embodiment.
Figure 10F:
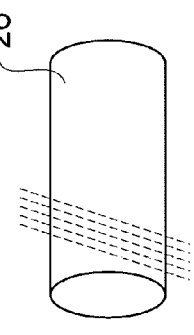
Figure 10I:
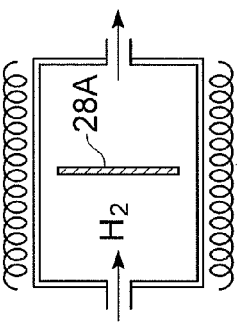
Figure 11:
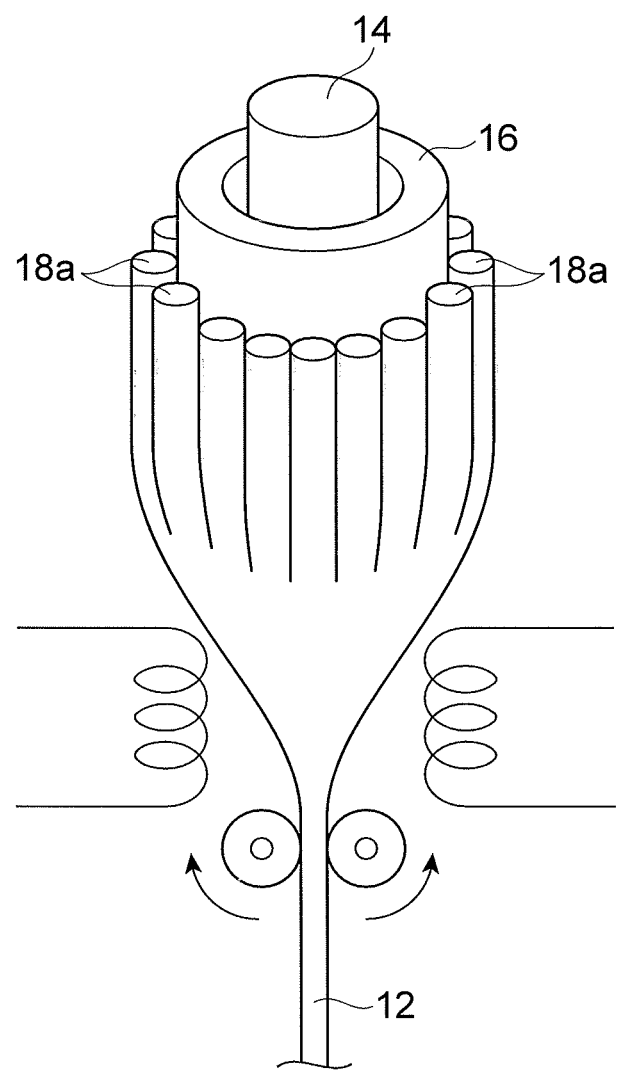
FIG. 11 is a drawing for explaining another forming method of channel fibers different from the forming method shown in FIG. 10A.
Figure 12A:
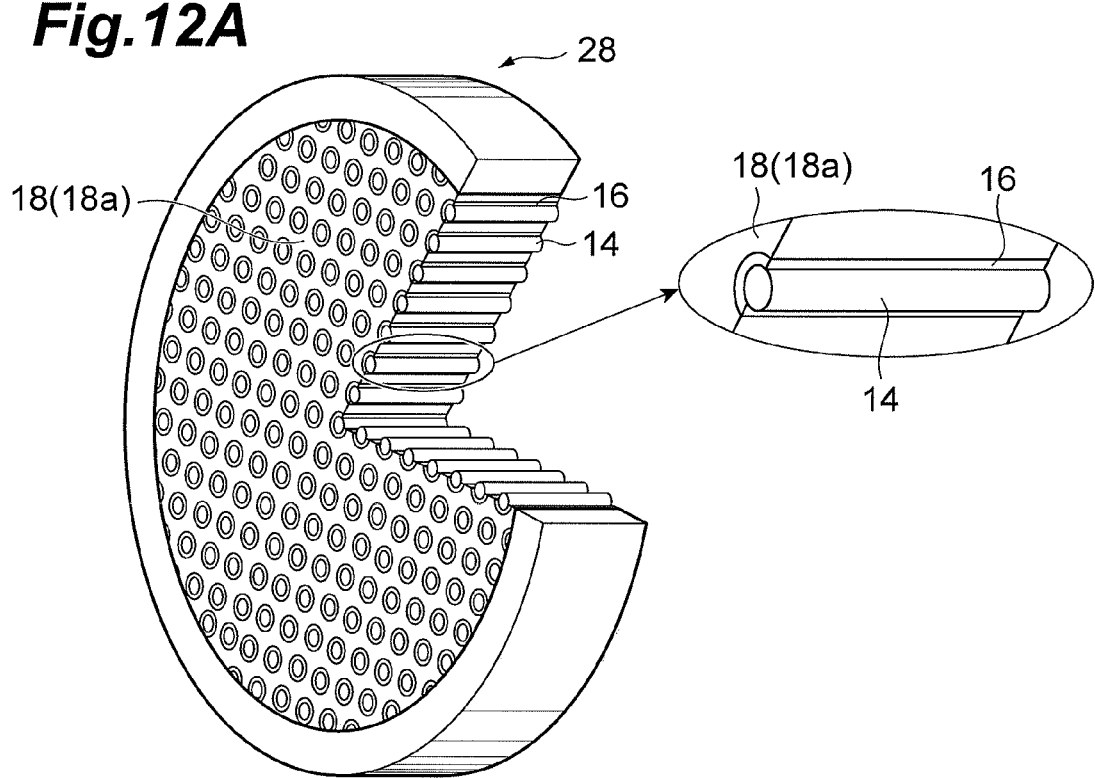
FIG. 12A is a partly broken view showing a sectional structure of MCP 28 before the channel formation shown in FIG. 10G (which corresponds to the partly broken view shown in FIG. 1A), and FIG. 12B a partly broken view of MCP 28A after the channel formation (which corresponds to the partly broken view shown in FIG. 1A)
Figure 12B:
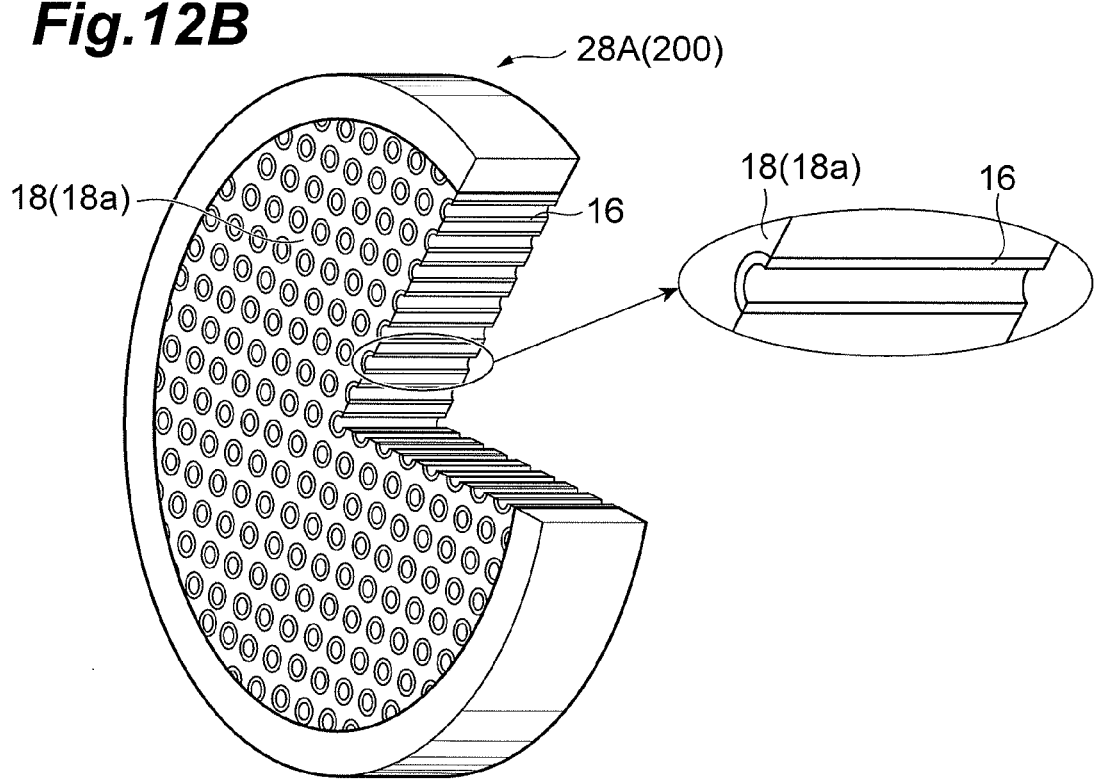

Since a manufacturing method of the MCP 100 is substantially the same as that described below, the description thereof is omitted herein. FIGS. 10A to 10I are drawings for explaining the manufacturing method of the double-cladding MCP according to the present embodiment. FIG. 11 is a drawing for explaining another channel fiber forming method different from the forming method shown in FIG. 10A. FIG. 12A is a partly broken view showing a sectional structure of MCP 28 before formation of channels shown in FIG. 10G (which corresponds to the partly broken view shown in FIG. 1A), and FIG. 12B is a partly broken view of MCP 28A after the formation of channels (which corresponds to the partly broken view shown in FIG. 1A).

First, a manufacturing method of MFs (multi-fibers) 10 will be described. FIG. 10A is a drawing showing a method for forming a channel fiber (first fiber) 12 in which a channel can be formed by a coring process. According to the same drawing, the channel fiber 12 is one obtained by inserting a core part (central portion) 14 made of a first glass material that is soluble in an acid used, into a cladding part (peripheral portion) 16 made of a second glass material that is insoluble in the same acid, and drawing these into fiber under heat. For forming the fiber in the double cladding structure, a cladding part 18 made of a third material that is insoluble in the same acid is further formed on the outer periphery of the cladding part 16. This cladding part 18 may be a tube that can house the cladding part 16 inside, or may be a large number of glass rods 18a surrounding the cladding part 16 as shown in FIG. 11. The cladding part 16 of this channel fiber 12 corresponds to the first cladding 210 of MCP 200 obtained finally, and the cladding part 18 or the large number of glass rods 18a to the second cladding 220.

Figure 10B:
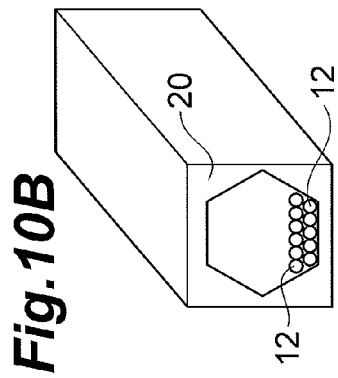

Subsequently, as shown in FIG. 10B, channel fibers 12 are stacked and arrayed in a predetermined pattern in parallel and in close contact in a mold 20 having a hollow cross section of a regular hexagon. Thereafter, the channel fibers 12 arrayed in the mold 20 are heated to be bonded to each other, and then cooled, and thereafter the mold 20 is removed. This step results in obtaining an MF preform 22 having a regular hexagonal cross section. Next, as shown in FIG. 10C, the MF preform 22 is drawn again under heat, to form MF 10. On that occasion, the preform 22 is drawn so as to form the MF 10 in the regular hexagonal cross section. The MF 10 may be formed by further stacking and arraying MFs obtained in this step, in a mold and drawing them. This step may be repeated until a desired channel diameter is achieved.

A manufacturing method of an MCP rod and the MCP 200 using a plurality of MFs 10 will be described below.

Figure 10E:
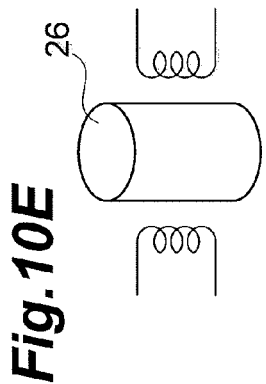
Figure 10H:
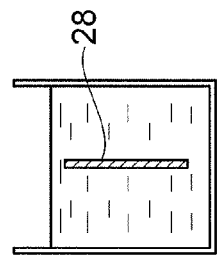
Figure 10A:
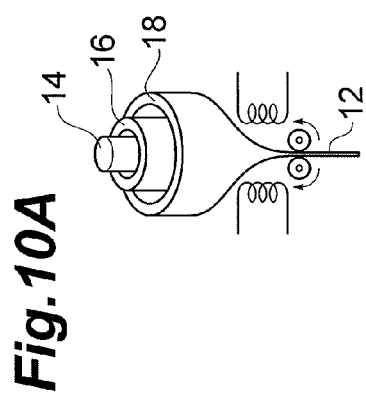
Figure 10D:
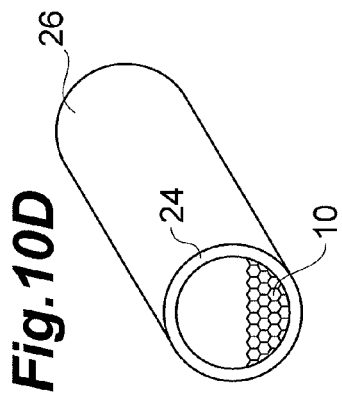

First, as shown in FIG. 10D, a plurality of obtained MFs 10 are arrayed inside a glass tube 24.

Figure 10G:
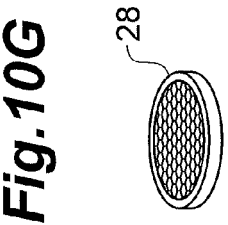

Subsequently, the MFs 10 arrayed inside the glass tube 24 are heated to be bonded to each other under pressure, obtaining an MCP preform 26 (cf. FIG. 10E). Thereafter, as shown in FIGS. 10F and 10G, the MCP preform 26 is sliced in a predetermined thickness and at a predetermined angle, and the resulting slice is subjected to surface polishing, obtaining an MCP slice 28. FIG. 12A is a drawing showing a sectional structure of the MCP slice 28. In this MCP slice 28, core parts 14 remain at positions to become the channels.

Furthermore, the coring process is carried out by immersing the MCP slice 28 in an acid solution, as shown in FIG. 10H. At this time, the core parts 14 of the channel fibers 12 are dissolved out in the acid because they are made of the first glass material soluble in the acid. On the other hand, the cladding part 16 and the cladding part 18 remain undissolved because they are made of the second glass material and the third glass material insoluble in the acid. For this reason, the channels 6 are formed by dissolution of the core parts 14. The coring process forms a secondary electron emitting layer containing $SiO_2$ as a major component on a surface of each channel 6. The coring process described above results in obtaining an MCP slice 28A shown in FIG. 12B.

The MCP slice 28A after the coring process is put in an electric furnace and heated under a hydrogen atmosphere to be subjected to a reduction treatment (cf. FIG. 10I). This treatment reduces PbO on the channel surfaces (inside surfaces of the secondary electron emitting layers) of the MCP slice 28A to Pb, forming desired electroconductive thin films. On this occasion, since the inside diameter of channels in corner regions is equal to that in surrounding regions thereof, the electroconductive thin films are formed with homogeneous quality. Finally, a metal for electrodes is evaporated on both sides of the MCP slice 28A (not shown), obtaining the MCP 200.

The MCPs 100, 100A, 200 of the embodiments with the above-described structures can be applied to a variety of devices. For example, FIG. 13A is a drawing showing a sectional structure of an image intensifier to which the MCP of the embodiment can be applied.

Figure 13A:
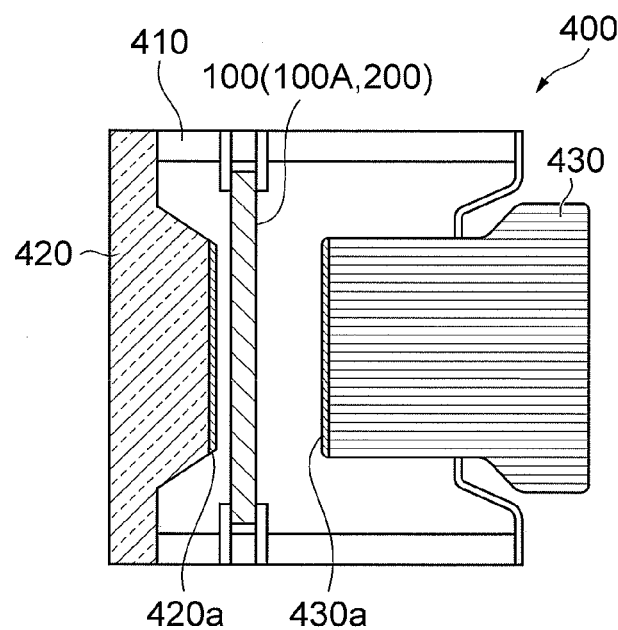
FIG. 13A is a drawing showing a sectional view of an image intensifier to which the MCP according to the present embodiment can be applied.

As shown in FIG. 13A, the image intensifier 400 is provided with a ceramic vacuum container 410, an entrance plate 420 set at one opening end of the vacuum container 410, a fiber optic plate (FOP) 430 set at the other opening end of the vacuum container 410, and the MCP 100 (100A, 200) located between the entrance plate 420 and the FOP 430. A photocathode 420a for converting light into electrons is formed on an inside surface of the entrance plate 420 (on the interior side of the vacuum container 410) and a phosphor screen 430a is formed on an entrance surface of the FOP 430. Particularly, the image intensifier 400 is designed so as to locate the MCP 100 (100A, 200) in close proximity to the phosphor screen 430a for converting electrons into light, thereby to obtain an image without distortion in the peripheral region.

Figure 13B:
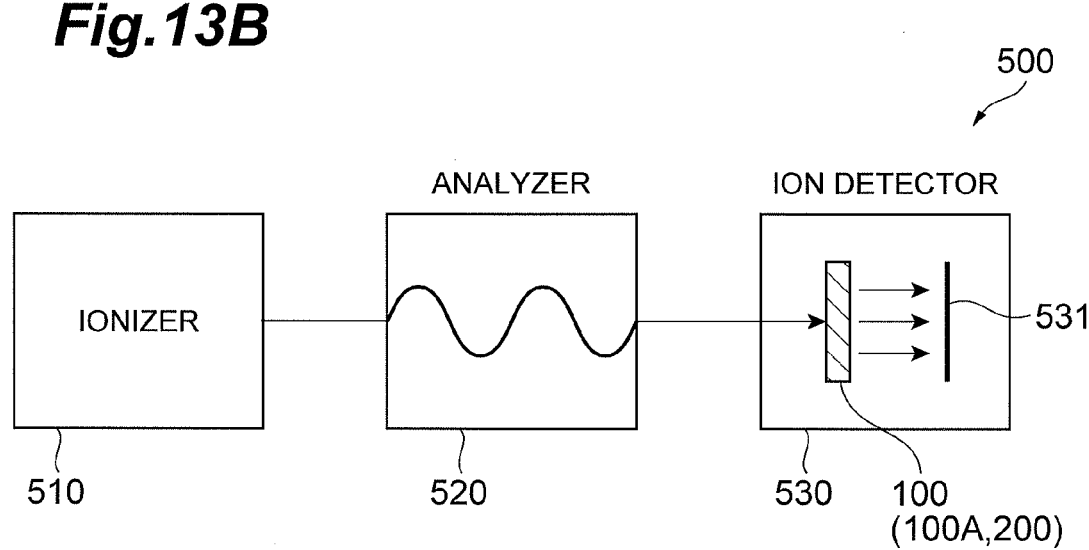
FIG. 13B is a conceptual drawing showing a configuration of a mass spectrometer as an inspection device to which the MCP according to the present embodiment can be applied.

Furthermore, the MCPs of the embodiments are also applicable to the inspection equipment such as the mass spectrometer, photoelectron spectrometer, electron microscope, and photomultiplier tube, as well as the foregoing image intensifier (FIG. 13A). FIG. 13B is a conceptual drawing showing a configuration of a mass spectrometer, as an example of the inspection equipment.

The mass spectrometer 500, as shown in FIG. 13B, is composed of an ionization unit 510 to ionize a specimen, an analysis unit 520 to separate the ionized specimen into ions according to a mass charge ratio, and an ion detection unit 530 to detect the ions having passed the analysis unit 520. The ion detection unit 530 is provided with the MCP of the embodiment, and an anode plate 531. For example, any one of the MCPs 100, 100A, and 200 of the embodiments functions as an electron multiplier which emits secondary electrons in response to incident ions. The anode plate 531 extracts the secondary electrons emitted from the MCP, as a signal.

As described above, the conventional MCP had restrictions on manufacture and characteristics because of the problem of acid resistance and strength resulting from the production of the low-resistance MCP by the increase of the lead content for expansion of the dynamic range. In contrast to it, the MCPs of the present embodiment can be readily obtained as low-resistance MCPs with stable MCP characteristics.

The present invention is notably effective, particularly, in the field of time-of-flight mass spectrometer (TOF-MS: Time Of Flight-Mass Spectrometer) because the dynamic range and the warp of MCP (structural degradation) both are important factors in that field.

From the above description of the present invention, it will be obvious that the invention may be varied in many ways. Such variations are not to be regarded as a departure from the spirit and scope of the invention, and all improvements as would be obvious to those skilled in the art are intended for inclusion within the scope of the following claims.

What is claimed is:

1. A microchannel plate comprising a main body comprised of lead glass which exhibits electric insulation before a reduction treatment and exhibits electric conduction after the reduction treatment,
    wherein the main body comprises:
    a front surface;
    a back surface opposing the front surface;
    channel walls each of which emits secondary electrons and continuously extends along a predetermined direction from the front surface to the back surface, the each continuous channel wall having one end located at the front surface and the other end located at the back surface;
    first cladding glasses each of which has a hollow structure extending along the predetermined direction and has an inner wall functioning as the each continuous channel wall, the each first cladding glass having one end located at the front surface and the other end located at the back surface; and
    a second cladding glass which has through holes each extending along the predetermined direction and accommodating an associated one among the first cladding glasses, the each through hole having one end located at the front surface and the other end located at the back surface while an entire inner wall of the each through hole is completely covered by and in direct contact with the associated first cladding glass, and
    wherein in comparison before the reduction treatment, the first cladding glasses have an acid resistance higher than an acid resistance of the second cladding glass, so that after the reduction treatment a low-resistance microchannel plate is produced with an expanded dynamic range and excellent environment resistance.

2. The microchannel plate according to claim 1, wherein as a resistance to any one of hydrochloric acid, nitric acid, sulfuric acid, phosphoric acid, and mixture solutions of said acids, the acid resistance before the reduction treatment of the first cladding glasses is higher than the acid resistance before the reduction treatment of the second cladding glass.

3. The microchannel plate according to claim 1, wherein a lead content of the second cladding glass is larger than a lead content of the first cladding glasses.

4. The microchannel plate according to claim 1, wherein the first cladding glasses before the reduction treatment contain lead oxide at a weight percentage of not less than 20.0% and less than 48.0%, and wherein the second cladding glass before the reduction treatment contains lead oxide at a weight percentage of not less than 48.0% and less than 65%.

5. The microchannel plate according to claim 1, wherein the first cladding glasses before the reduction treatment contain silicon dioxide at a weight percentage of not less than 40.0% and less than 65.0%, and wherein the second cladding glass before the reduction treatment contains silicon dioxide at a weight percentage of not less than 20.0% and less than 40.0%.

6. The microchannel plate according to claim 1, wherein the first cladding glasses contain zirconium oxide before the reduction treatment.

7. The microchannel plate according to claim 1, wherein in a cross section of the main body perpendicular to the predetermined direction, outer peripheries of the first cladding glasses are deformed in a hexagonal shape whereby the second cladding glass constitutes a honeycomb structure.

8. The microchannel plate according to claim 1, wherein in a cross section of the main body perpendicular to the predetermined direction, an area ratio of the first cladding glasses in the cross section is smaller than an area ratio of the second cladding glass in the cross section.

9. The microchannel plate according to claim 1, wherein in a cross section of the main body perpendicular to the predetermined direction, an area ratio of the second cladding glass in the cross section is not less than 25%.

10. An image intensifier comprising the microchannel plate as defined in claim 1.

11. An ion detector comprising the microchannel plate as defined in claim 1.

12. An inspection device comprising the ion detector of claim 11.

13. The inspection device according to claim 12, the inspection device including a mass spectrometer, a photoelectron spectrometer, an electron microscope, or a photomultiplier tube.

14. A microchannel plate comprising a main body comprised of lead glass which exhibits electric insulation before a reduction treatment and exhibits electric conduction after the reduction treatment,
    wherein the main body comprises:
    a front surface;
    a back surface opposing the front surface;

channel walls each of which emits secondary electrons and continuously extends along a predetermined direction from the front surface to the back surface, the each continuous channel wall having one end located at the front surface and the other end located at the back surface;

a cladding glass which has through holes extending along the predetermined direction and which contains lead oxide at a weight percentage of not less than 48.0% and less than 65% before the reduction treatment, the each through hole having one end located at the front surface and the other end located at the back surface; and coating materials each of which has an inner wall functioning as the each continuous channel wall and is accommodated in an associated one among the through holes in the cladding glass while completely covering an entire inner wall of the associated through hole, the each coating material having one end located at the front surface and the other end located at the back surface, wherein the coating materials have an acid resistance before the reduction treatment higher than an acid resistance of the cladding glass before the reduction treatment, so that after the reduction treatment a low-resistance microchannel plate is produced with an expanded dynamic range and excellent environment resistance.

15. The microchannel plate according to claim 14, wherein the cladding glass before the reduction treatment contains silicon dioxide at a weight percentage of not less than 20.0% and less than 40.0%.

16. An image intensifier comprising the microchannel plate as defined in claim 14.

17. An ion detector comprising the microchannel plate as defined in claim 14.

18. An inspection device comprising the ion detector of claim 17.

19. The inspection device according to claim 18, the inspection device including a mass spectrometer, a photoelectron spectrometer, an electron microscope, or a photomultiplier tube.

* * * * *